(12) United States Patent
Traynor

(10) Patent No.: US 6,263,403 B1
(45) Date of Patent: Jul. 17, 2001

(54) METHOD AND APPARATUS FOR LINKING TRANSLATION LOOKASIDE BUFFER PURGE OPERATIONS TO CACHE COHERENCY TRANSACTIONS

(75) Inventor: Michael K. Traynor, San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/430,794

(22) Filed: Oct. 31, 1999

(51) Int. Cl.[7] ................................. G06F 12/00
(52) U.S. Cl. ............... 711/133; 711/135; 711/136; 711/143; 711/146; 711/121; 711/205; 711/206; 711/207; 711/141; 711/145
(58) Field of Search ................ 711/135, 136, 711/143, 146, 121, 205, 206, 207, 141, 133, 145

(56) References Cited

U.S. PATENT DOCUMENTS

| | | | | |
|---|---|---|---|---|
| 4,849,881 | * | 7/1989 | Eguchi | 711/205 |
| 5,574,878 | * | 11/1996 | Ibidera et al. | 711/207 |
| 5,966,733 | * | 10/1999 | Brewer | 711/170 |
| 6,105,113 | * | 8/2000 | Schimmel | 711/146 |

* cited by examiner

Primary Examiner—Hiep T. Nguyen
Assistant Examiner—Vu A. Pham
(74) Attorney, Agent, or Firm—David A. Plettner

(57) ABSTRACT

A method and apparatus link translation lookaside buffer (TLB) purge operations to cache coherency transactions, thereby allowing the TLB purge operations to be performed by hardware without significant software intervention. Computer systems having cache memories associated with multiple cache modules, such as a CPU or an I/O device, typically use a cache coherency protocol to ensure that the cache memories remain consistent with each other and with main memory. Popular cache coherency protocols usually include an INVALIDATE transaction that signals cache memories to invalidate a cache line associated with the address contained in the transaction. A TLB in accordance with the present invention will observe the physical address contained in an INVALIDATE request and determine whether address lies within the page table. If it does, the physical address into the page table will be converted into a virtual page number. The TLB will then be accessed to see if the TLB contains an entry for the virtual page number. If it does, that entry is purged from the TLB. By piggy-backing TLB purges on top of cache coherency transactions, the latency involved with software-based TLB purge operations of the prior art is eliminated. Furthermore, the complexity of the software required to implement the virtual memory scheme is reduced greatly because TLB purge operations are now handled by hardware.

12 Claims, 3 Drawing Sheets

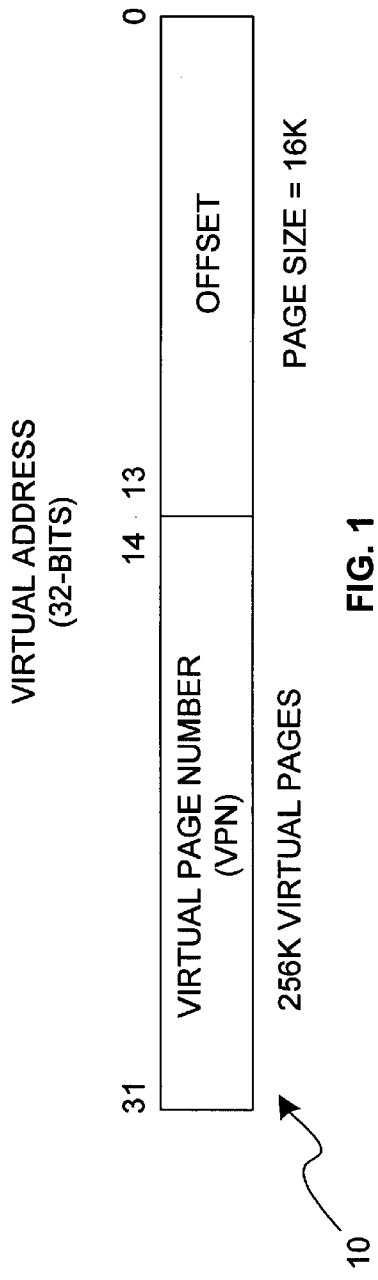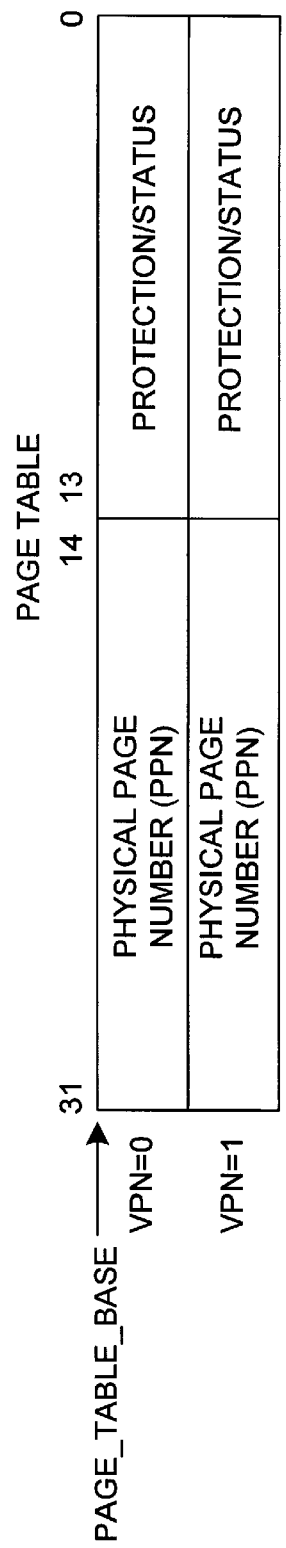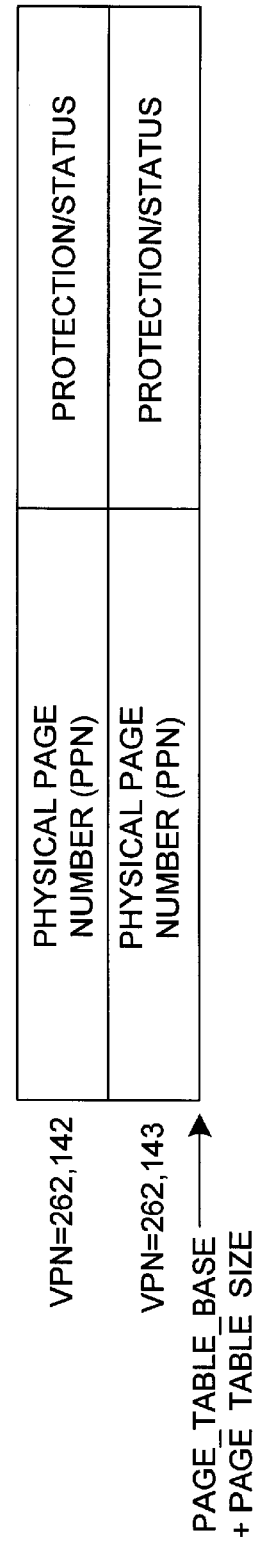
FIG. 1
FIG. 2

METHOD AND APPARATUS FOR LINKING TRANSLATION LOOKASIDE BUFFER PURGE OPERATIONS TO CACHE COHERENCY TRANSACTIONS

FIELD OF THE INVENTION

The present invention relates to the field of high performance computing. More particularly, the present invention relates to the need to maintain consistency between virtual-to-physical translations that are stored in a plurality of translation lookaside buffers (TLBs).

DESCRIPTION OF THE RELATED ART

Conventional computer systems use a technique called virtual memory to simulate more logical memory than actually exists, and to allow the computer to run several programs concurrently. Concurrent user programs access main memory addresses via virtual addresses assigned by the operating system. The mapping of the virtual addresses to the physical addresses of the main memory is a process known in the art as virtual address translation. Virtual address translation can be accomplished by any number of techniques, thereby allowing the processor (or alternatively, CPU) to access the desired information in main memory. Note that many computer systems also use virtual address translation when performing I/O operations. While the discussion below relates to virtual address translation performed by processors, those skilled in the art will recognize that the discussion is also applicable to any module in a computer system that translates virtual addresses to physical address, such as an I/O module.

The virtual address and physical address spaces are typically divided into equal size blocks of memory called pages, and a page table (PT) provides the translation between virtual addresses and physical addresses. Each page table entry (PTE) typically includes the virtual address, and protection and status information concerning the page. Status information typically includes information about the type of accesses the page has undergone. For example, a dirty bit indicates there has been a modification to data in the page. Because the page tables are usually large, they are stored in main memory. Therefore, each regular memory access can actually require at least two accesses, one to obtain the translation and a second to access the physical memory location.

Many computer systems that support virtual address translation use a translation lookaside buffer (TLB). The TLB is typically a small, fast memory that is usually situated on or in close proximity to the processor unit (or other module) and stores recently used pairs of virtual-to-physical address translations in the form of PTEs. In a multiprocessor system, a TLB is typically provided for each processor. In addition, TLBs are often provided at the interface between I/O devices and main memory to facilitate fast virtual-to-physical translations, as discussed above.

The TLB contains a subset of the PTEs in the page table, and can be accessed much more quickly than the page table. When the processor information from main memory, it sends the virtual address to the TLB. The TLB accepts the virtual address page number and returns a physical page number. The physical page number is combined with low order address information to access the desired byte or word in main memory.

Typically the TLB cannot contain the entire page table, so various procedures are required to update the TLB. When a virtual address is generated by the processor, and the translation is not in the TLB, the page table is accessed to determine the translation of the virtual page number contained in the virtual address to a physical page number, and this information is entered in the TLB. Access to the page table can take twenty times longer than access to the TLB, and therefore program execution speed is optimized by keeping the translations being utilized in the TLB.

The entries of all TLBs must be kept consistent with the corresponding entries in the page table. TLB consistency is typically a software responsibility in current computer systems. Usually, software must modify a PTE in the page table, then explicitly issue a special instruction sequence to cause the appropriate TLBs in the system to invalidate any prior copies of the updated PTE. Software must then wait until all the TLBs have completed the invalidate request before continuing operation. The following pseudocode sequence illustrates a typical method of ensuring TLB consistency after a PTE has been updated in the page table:

1: // Update PTE in page table (PT)
2: PT[PTE]=newPTE;
3: // Invalidate old PTE in all TLBs
4: PURGE_TLB[VirtualPageNum];// This is an ordered operation
5: // CPU spins while waiting for PURGE_TLB to complete
6: // All TLBs observe, execute, and acknowledge the PURGE_TLB request;
7: // CPUs continue operation
8: . . .

The pause between the PURGE_TLB command at line 4 and the continuation of operation at line 7 in the above example may delay processing for hundreds or thousands of CPU cycles in large multiprocessor systems. Such systems must multicast the PURGE_TLB command to many TLBs in tightly coupled multiprocessor systems, or unicast the PURGE_TLB commands in loosely coupled multiprocessor systems to a individual TLBs that may be coupled to the main memory by a high latency interconnection fabric.

Operations which require frequent manipulation of the page table may lose many hundreds or even thousands of CPU cycles to TLB manipulation. One example of such an operation may be I/O buffer manipulation in a web or file server which employs an I/O page table for translating I/O addresses to physical memory addresses. In such a system, many PTEs may be manipulated, with each manipulation requiring a PURGE_TLB operation for each I/O request.

An added complication not shown in the above example is that many systems limit the number of PURGE_TLB requests that may be outstanding at any time, forcing the CPUs and other modules in a multiprocessor system to coordinate their page table manipulation activities, even when such coordination would not otherwise be necessary. This coordination adds software complexity and communication overhead.

In a paper entitled "DEC OSF/1 Symmetric Multiprocessing" by Jeffrey M. Denham, Paula Long, and James A. Woodward, which appeared in the Digital Technical Journal (Vol. 6, No. 3) in 1994, Denham, et al. disclosed a method of eliminating the broadcast operations commonly used in bus based systems and reducing synchronization complexity. Denham et al. proposed that the CPU that intends to modify the page table use interrupts to cause software executing on other CPUs to issue their own PURGE_TLB commands to their local TLBs. By directing interrupts only to CPUs which share PTEs, the broadcast nature of normal PURGE_TLB operations can be avoided, thereby allowing a solution which scales with the number of CPUs sharing a common page table. Synchronization is simplified since interrupts are normally serialized by hardware. The method disclosed by Denham et al. still has the disadvantage of costing hundreds or thousands of CPU cycles, as the CPU modifying the page table cannot continue until the other interrupted CPUs observe, process, and acknowledge the interrupt. Also, the interrupted CPUs lose hundreds of cycles since they must service the interrupt, purge their local TLBs, and spin while waiting for the operation to complete.

In a paper entitled "FUGU: Implementing Translation and Protection in a Multiuser, Multimodel Multiprocessor" by Kenneth Mackenzie, John Kubiatowicz, Anant Agarwal, and Frans Kaashoek, which was published on Oct. 24, 1994, Mackenzie, et al. describe a related approach for tying hardware cache coherency with TLB consistency. In their approach, when memory controller hardware observes that a PTE is likely to be modified, the memory controller invokes a CPU interrupt that causes software to send invalidate requests to the appropriate TLBs within the system. This approach appears to require more overhead than traditional approaches because software needs to perform a context switch to service the interrupt, in addition to performing the PURGE_TLB operations described above. However, the advantage of this approach over the traditional approach and the method disclosed by Denham et al. appears to be that the software that modifies the page table may be decoupled from the software that maintains TLB consistency.

A common disadvantage in all the methods described above is that software must initiate the PURGE_TLB request. Accordingly, each of these methods require hundreds or thousands of CPU cycles to complete.

SUMMARY OF THE INVENTION

The present invention is a method and apparatus for linking translation lookaside buffer (TLB) purge operations to cache coherency transactions, thereby allowing the TLB purge operations to be performed by hardware without significant software intervention. TLB purge operations are typically required when a virtual-to-physical memory translation in a page table is modified, thereby rendering corresponding translations in the TLBs invalid. In the prior art, TLB purge operations were initiated by software.

Computer systems having cache memories associated with multiple cache modules, such as CPUs or I/O devices, use a cache coherency protocol to ensure that the cache memories remain consistent with each other and with main memory. Popular cache coherency protocols typically include an INVALIDATE transaction that signals the cache memories to invalidate a cache line associated with the address contained in the transaction.

A TLB in accordance with the present invention will observe the physical address contained in the INVALIDATE request, and determine whether address lies within the page table. If it does, the physical address into the page table will be converted into a virtual page number. The TLB will then be accessed to see if the TLB contains an entry for the virtual page number. If it does, that entry is purged from the TLB.

The hardware-based TLB purge method provided by the present invention is far superior to prior art software-based methods. By piggy-backing TLB purges on top of cache coherency transactions, the latency involved with software-based TLB purge operations of the prior art is eliminated. Furthermore, the complexity of the software required to implement the virtual memory scheme is greatly reduced because TLB purge operations are now handled by hardware.

BRIEF DESCRIPTION OF THE DRAWINGS

FIG. 1 illustrates a virtual address format for a simplified computer architecture that is used to describe the present invention.

FIG. 2 illustrates a page table for the simplified computer architecture that is used to describe the present invention.

DETAILED DESCRIPTION OF THE PREFERRED EMBODIMENTS

Figure 3:
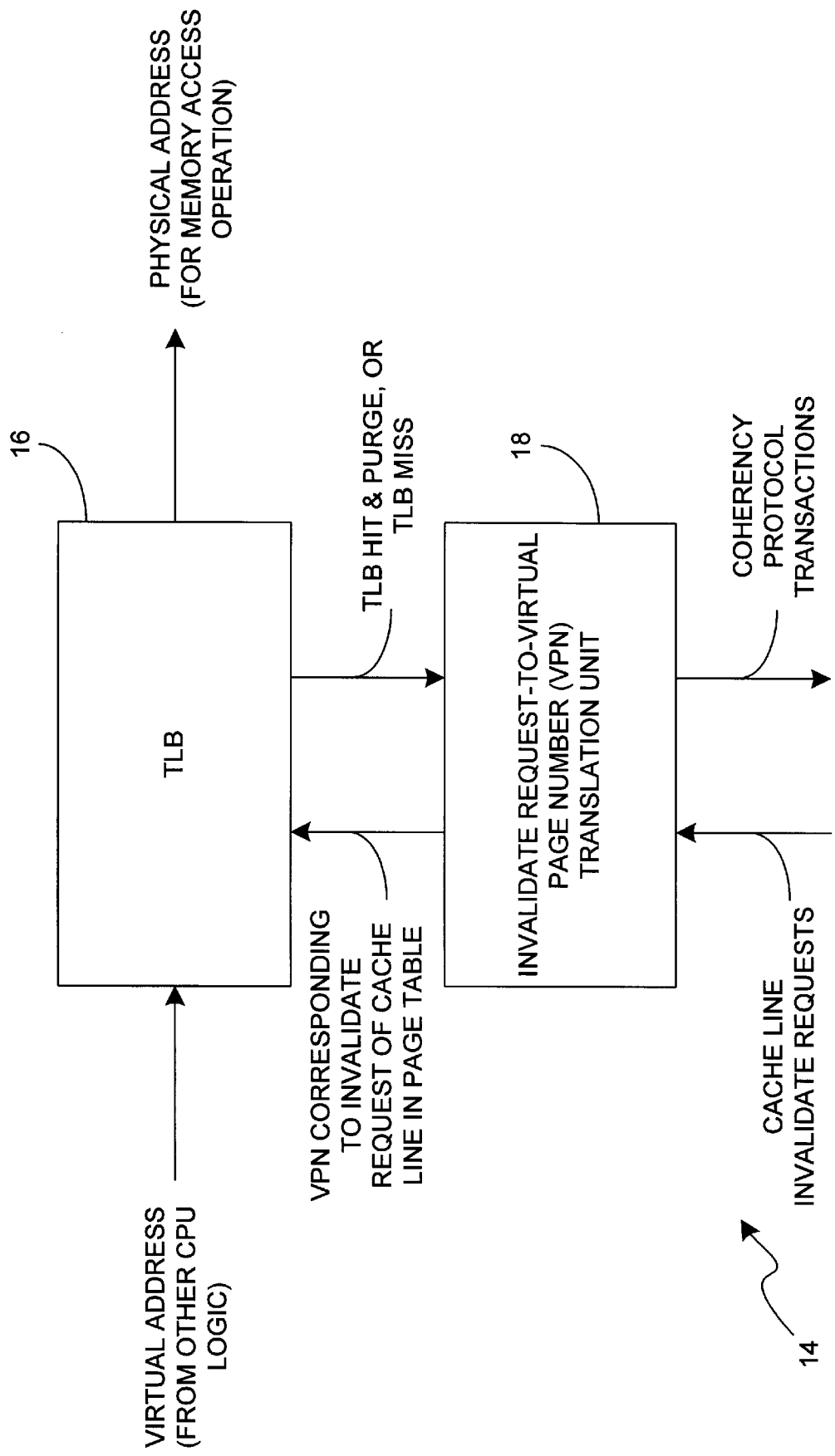
FIG. 3 illustrates a portion of a CPU capable of purging TLB entries in accordance with the present invention, including a translation lookaside buffer (TLB) and an INVALIDATE request-to-virtual page number (VPN) translation unit.

The present invention is a method and apparatus for linking translation lookaside buffer (TLB) purge operations to cache coherency transactions, thereby allowing the TLB purge operations to be performed by hardware without significant software intervention. Accordingly, compared with prior art TLB purge methods, the method of purging TLB entries provided by the present invention is significantly faster, while also reducing software complexity.

Before considering the present invention in greater detail below, first consider two well known methods of maintaining cache coherency in multiprocessor systems. These two methods are known in the art as the "snoopy" method and the "directory-based" method.

In a typical multiprocessor computer system employing the snoopy method, the CPU, I/O module, or other module that seeks to modify the contents of a memory location broadcasts a READ-AND-INVALIDATE request to main memory and all other CPUs and modules that maintain caches. As used herein, the term "cache module" will be used to refer to any CPU, I/O device, or other module that maintains a cache that stores a subset of the contents of main memory. This request is observed by main memory and all cache modules, and the most up-to-date copy of the data is sent from either main memory or another cache to the requesting cache module, while any other copies of the data maintained in caches of other cache modules are invalidated.

When a cache module seeks to read a memory location without modifying the contents of the location, that cache module broadcasts a READ request to all other cache modules and main memory. All cache modules and main memory observe this request, and the most up-to-date copy of the data is returned to the requesting cache module from main memory or another cache. Thereafter, no other cache module can subsequently modify this data without first issuing a READ_AND_INVALIDATE request.

In a typical multiprocessor computer system employing the directory-based method, a directory (typically associated with main memory) is maintained that specifies the "owners" and "sharers" of every cache line from main memory. A cache module that intends to modify a memory location directs a READ_PRIVATE request to the memory controller. The memory controller interrogates the directory, locates and retrieves the most up-to-date copy of the data (which may be in main memory or another cache), directs INVALIDATE requests to any "sharers" of the data, directs the most up-to-date copy of the data to the requesting module, and modifies the directory to indicate that the cache line is now "owned" by the requesting module. When a cache module seeks to read a memory location, the cache module directs a READ request to the memory controller. Again, the memory controller interrogates the directory, locates the most up-to-date copy of the data, sends the data to the requesting cache module, and updates the directory to indicate that the requesting cache module is now a "sharer" of the cache line. No module can subsequently modify the data contained in this cache line without first acquiring ownership via a READ_PRIVATE request.

Note that a large multiprocessor system may use both protocols in a layered scheme. For example, consider a multiprocessor system comprised of a series of clusters of processors. Within each cluster, the CPUs are coupled by a common bus and the snoopy method is employed. The clusters are coupled together using some sort of fabric, such as a ring or a crossbar, with the directory-based method used to provide cache coherency among the clusters. In such an arrangement, the directory only keeps track of the clusters, and when a directory-based transaction is directed to a cluster, the snoopy method is used within the cluster to complete the coherency transaction.

In accordance with the present invention, a TLB maintains coherency with a page table by observing READ_AND_INVALIDATE requests in a computer system using a snoopy-based cache coherency protocol, or by observing INVALIDATE requests in a computer system using a directory-based cache coherency protocol. The term "INVALIDATE request" will be used herein to apply to both types of requests.

Basically, a TLB in accordance with the present invention will observe the physical address contained in an INVALIDATE request and determine whether the physical address lies within the page table. If it does, the physical address into the page table will be converted into a virtual page number. The TLB will then be accessed to see if the TLB contains an entry for the virtual page number. If it does, that entry is purged. This will be described in greater detail below with reference to FIGS. 1–4.

In the following description, numerous specific details are set forth, such as particular information fields, processor structures, encodings, etc., in order to provide a thorough understanding of the present invention. It should be understood, however, that these specific details need not be used to practice the present invention. In other instances, well known structures, circuits, methods, etc., have not been shown in detail to avoid obscuring the invention.

To facilitate an understanding of the present invention, a simplified computer architecture having a fixed page size of 16 kilobytes will be presented. Those skilled in the art will understand how to adapt the teachings herein to more complex architectures that are common in the art.

FIG. 1 shows a virtual address format 10 for this architecture. Virtual address 10 is 32 bits wide. Since the page size is 16 kilobytes, bits 0–13 represent an offset into the page, and bits 14–31 represent the virtual page number. Accordingly, there are 256K virtual pages.

FIG. 2 shows a page table 12 for use with this architecture. The page table is anchored in physical memory by the variable PAGE_TABLE_BASE, which refers to an address in physical memory. Each page table entry (PTE) is also 32 bits wide. Bits 14–32 store the physical page number (PPN) associated with the virtual-to-physical translation. Bits 0–13 are used to encode various types of status and protection information, as is known in the art.

The variable PAGE_TABLE_SIZE stores the size of the page table. Since table 12 has 256K entries, and each entry is four bytes wide, the table occupies one megabyte of physical memory in this example. To calculate the physical address of a PTE from a virtual address, the VPN is extracted from the virtual address, multiplied by 4 (the number of bytes in each PTE), and is added to PAGE_TABLE_BASE. The PTE can then be accessed to retrieve the corresponding PPN associated with the translation. For the sake of simplifying the explanation of the present invention, assume that a cache line also holds 4 bytes.

Figure 4:
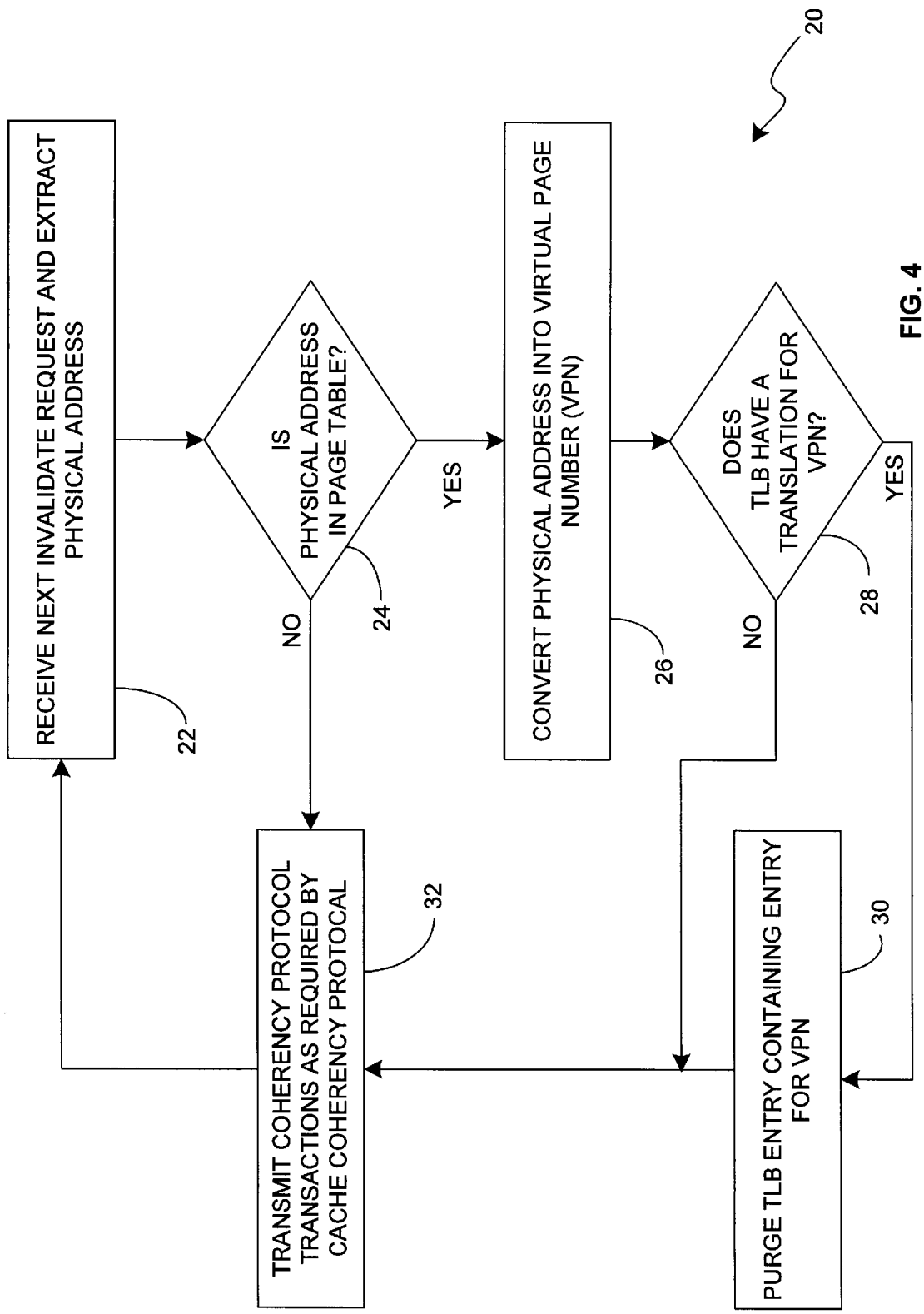
FIG. 4 shows a flowchart that illustrates how the TLB and the INVALIDATE request-to-virtual page number (VPN) translation unit cooperate to purge a TLB entry in accordance with the present invention.

FIG. 3 shows a portion of a CPU 14 capable of purging TLB entries in accordance with the present invention. While a CPU is shown, those skilled in the art will recognize that the following discussion applies to any module that maintains a TLB and a cache memory. The portion of CPU 14 shown in FIG. 3 includes TLB 16 and INVALIDATE request-to-virtual page number (VPN) translation unit 18. FIG. 4 is a flowchart 20 that illustrates how TLB 16 and unit 18 cooperate to purge a TLB entry in accordance with the present invention. FIGS. 3 and 4 will be discussed together.

When CPU 14 is performing a memory access operation, a virtual address from other CPU logic is presented to TLB 16. If TLB 16 has a translation for the virtual address, it provides the physical address to complete the memory operation. If it does not, a TLB miss is signaled.

In the following discussion, the present invention will be presented by way of example. In this example, assume that TLB 16 contains a translation for VPN 1, and PAGE_TABLE_BASE is 1A000000H (which is specified in hexadecimal format). Further assume that some other module, such as another CPU or I/O device, seeks to alter the virtual-to-physical translation for VPN 1. The address of the PTE in table 12 corresponding to VPN 1 is 1A000004. To modify this memory location, the other module will need to gain control of the cache line containing this location. In a computer system using the snoopy method of cache coherency, the other cache module will broadcast a READ_AND_INVALIDATE request, as described above. In a computer system using the directory-based method of cache coherency, the other cache module will direct a READ request to the memory controller, and the memory controller will direct an INVALIDATE request to other modules sharing the cache line. Note that to implement the present invention in a computer system using the directory-based method, the directory will need to treat any TLB entries as "sharers" of cache lines in the page table, thereby allowing the memory controller to direct INVALIDATE requests to the TLBs. Also note that the computer system may use both protocols in a layered scheme, as described above.

In any event, whether a directory-based method, a snoopy method, or a combined layered scheme is employed, a cache line INVALIDATE request will be presented to unit 18 in FIG. 3. This step is shown in flowchart 20 of FIG. 4 in block 22. The physical address contained in the INVALIDATE request is also extracted in block 22.

Next, decision block 24 determines whether the physical address references an entry in page table 12. This can be accomplished by subtracting PAGE_TABLE_BASE from the address, and testing whether the result is less than or equal to PAGE_TABLE_SIZE. If the address does not reference page table 12, TLB 16 signals unit 18 that a TLB miss has occurred, and the "NO" branch is taken to block 32. Unit 18 uses this signal to transmit any coherency transactions required by the particular coherency protocol, as shown in block 32. For example, in a computer system using the directory-based method, unit 18 would send a message to the memory controller indicating that it does not hold a TLB entry associated with the address of the page table entry for VPN 1, and therefore the memory controller would not direct any future INVALIDATE requests for this address to CPU 14 (or the cluster containing CPU 14 in a multiprocessor system using a layered protocol scheme) until a new translation for VPN 1 is inserted into TLB 16. Next, control passes back to block 22 and unit 18 waits to receive the next INVALIDATE request.

However, if the address does reference the page table (as it does in this example), the "YES" branch is taken to block 26. Block 26 converts the address into a VPN. This can be performed by subtracting PAGE_TABLE_BASE from the address (which was done above) to form an offset into the page table, and dividing the result by the number of bytes in each PTE. Since each PTE of page table 12 is 4 bytes wide, this dividing operation can be performed by simply shifting the offset left by two bits. Unit 18 then presents the VPN to TLB 16.

TLB 16 then determines whether it has a translation for the VPN supplied by unit 18, as shown in decision block 28. Note that there are many TLB organizations known in the art. In a purely associative TLB, each entry of the TLB is searched to see if it contains the VPN. In a direct-mapped or set-associative TLB, the VPN will be divided into an index and a tag. The index will be used to access a direct-mapped entry or an associative subset of entries, and the tag will be used to see if any of the entries contain the VPN. Those skilled in the art will recognize how to search a particular TLB organization using the VPN provided by unit 18.

If TLB 16 does not contain a translation corresponding to the VPN, TLB 16 signals a TLB miss to unit 18, the "NO" branch is taken to block 32, and unit 18 generates any required coherency transactions, as described above. Control then passes to block 22 and unit 18 waits to receive the next INVALIDATE request.

However, if TLB 16 does contain a translation for the VPN (as in this example), the "YES" branch will be taken to block 30, where TLB 16 will purge the TLB entry containing the translation for the VPN. TLB 16 will then signal unit 18 that it has detected a TLB hit for the VPN provided by unit 18, and has purged the entry associated with the VPN. Control then passes to block 32, and as discussed above, unit 18 uses the signal from CPU 16 to transmit any coherency transactions required by the particular coherency protocol. Control then passes to block 22 and unit 18 waits for the next INVALIDATE request.

Also note that any hardware or software routines that insert translations into the TLB should participate in the coherency protocol as is appropriate. For example, if CPU 14 attempts to access VPN 1, and TLB 16 generates a TLB miss, the TLB miss handler should update the directory to reflect the fact that TLB 16 now has a translation for TLB 1.

In conclusion, the present invention provides a method and apparatus for performing TLB purge operations which is far superior to prior art software-based methods. By piggy-backing TLB purges on top of cache coherency transaction, the latency involved with software-based TLB purge operations of the prior art is eliminated. Furthermore, the complexity of the software required to implement the virtual memory scheme is reduced greatly because TLB purge operations are now handled by hardware.

Another benefit of the present invention is that minimal additional hardware is required. All that is needed is a small amount of logic to monitor INVALIDATE requests, extract the VPNs, and generate cache coherency transactions, along with some logic required to allow TLBs to be treated in a manner similar to the cache memories.

Although the present invention has been described with reference to preferred embodiments, workers skilled in the art will recognize that changes may be made in form and detail without departing from the spirit and scope of the invention.

What is claimed is:

1. A method of purging a translation lookaside buffer entry based on a cache invalidate request transaction comprising:
   receiving the cache invalidate request transaction;
   extracting a physical address from the cache invalidate request transaction;
   determining whether the physical address refers to an entry in a page table;
   converting the physical address into a virtual page number if the physical address refers to an entry in the page table;
   determining if the translation lookaside buffer contains a translation for the virtual page number if the physical address refers to an entry in the page table; and
   purging a translation lookaside buffer entry containing the virtual page number if the physical address refers to an entry in the page table and if the translation lookaside buffer contains a translation for the virtual page number.

2. The method of claim 1 and further comprising:
   transmitting any other cache coherency transactions required by a cache coherency protocol that includes the cache invalidate request transaction.

3. The method of claim 1 wherein determining whether the physical address refers to an entry in a page table comprises subtracting a page table base address from the physical address to form a result, and testing the result to determine if the result is less than or equal to a size of the page table.

4. The method of claim 1 wherein converting the physical address into a virtual page number if the physical address refers to an entry in the page table comprises subtracting a page table base address from the physical address to form an offset, and dividing the offset by a size of each page table entry.

5. A method of updating a page table entry in a page table to replace an old translation with a new translation, and purging a translation lookaside buffer entries that contain the old translation using a cache invalidate request transaction comprising:
   issuing a cache coherency transaction to gain exclusive access to a cache line containing the page table entry to be modified at a first module;
   replacing the old translation with the new translation at the first module;
   receiving a cache invalidate request transaction associated with the cache coherency transaction to gain exclusive access to a cache line at a second module;
   extracting a physical address from the cache invalidate request transaction at the second module;
   determining whether the physical address refers to an entry in the page table at the second module;
   converting the physical address into a virtual page number at the second module if the physical address refers to an entry in the page table;
   determining if the translation lookaside buffer contains a translation for the virtual page number at the second module if the physical address refers to an entry in the page table; and purging a translation lookaside buffer entry containing the virtual page number at the second module if the physical address refers to an entry in the page table and if the translation lookaside buffer contains a translation for the for the virtual page number.

6. The method of claim 5 and further comprising:

transmitting from the second module any other cache coherency transactions required by a cache coherency protocol that includes the cache invalidate request transaction and the cache coherency transaction to gain exclusive access to a cache line.

7. The method of claim 5 wherein determining whether the physical address refers to an entry in a page table at the second module comprises subtracting a page table base address from the physical address to form a result, and testing the result to determine if the result is less than or equal to a size of the page table at the second module.

8. The method of claim 5 wherein converting the physical address into a virtual page number at the second module if the physical address refers to an entry in the page table comprises subtracting a page table base address from the physical address to form an offset, and dividing the offset by a size of each page table entry at the second module.

9. A computer system comprising:

a main memory that stores a page table that includes entries holding virtual-to-physical memory translations; and a plurality of modules, with each module including:

a cache memory that participates an a cache coherency protocol to remain coherent with main memory and the cache memories of other modules;

a translation lookaside buffer that stores a subset of the entries of the page table; and an invalidate request-to-virtual page number unit coupled the translation lookaside buffer and capable of participating in the cache coherency protocol, wherein the invalidate request-to-virtual page number unit receives a cache invalidate request transaction, extracts a physical address from the cache invalidate request transaction, and determines whether the physical address refers to an entry in the page table, if the physical address refers to an entry in the page table, the invalidate request-to-virtual page number unit converts the physical address into a virtual page number, and determines if the translation lookaside buffer contains a translation for the virtual page number, if the translation lookaside buffer contains a translation for the virtual page number, the translation lookaside buffer entry containing the virtual page number is purged.

10. The computer system of claim 9 wherein the invalidate request-to-virtual page number unit transmits any other cache coherency transactions required by a cache coherency protocol that includes the cache invalidate request transaction.

11. The computer system of claim 9 wherein the invalidate request-to-virtual page number unit determines whether the physical address refers to an entry in a page table by subtracting a page table base address from the physical address to form a result, and testing the result to determine if the result is less than or equal to a size of the page table.

12. The computer system of claim 9 wherein the invalidate request-to-virtual page number unit converts the physical address into a virtual page number by subtracting a page table base address from the physical address to form an offset, and dividing the offset by a size of each page table entry.

\* \* \* \* \*